Patented Dec. 22, 1942

2,306,270

UNITED STATES PATENT OFFICE 2,306,270

LUMINESCENT MATERIAL

Humboldt W. Leverenz, South Orange, N. J., assignor to Radio Corporation of America, a corporation of Delaware No Drawing. Application September 25, 1940, Serial No. 358,299

10 Claims. (Cl. 250—81)

This invention relates to a synthesized luminescent material and to the process for making such material. In particular, the invention is directed to producing luminescent materials of improved properties and predetermined spectral luminosity, which luminosity may be controlled to give unsaturated, i. e., pale colors approaching white light.

My new luminescent material has consistent reproducible physical characteristics even when the tolerance limits of the physical properties of the material have been held to small values. Such properties have been their spectral emission characteristic, resistance to injury by cathode ray excitation and uniform response to excitation. The present invention is concerned with new luminescent materials and the method of processing this new material, which will have reproducible characteristics so that batches of luminescent material manufactured on different days will have substantially identical physical properties. This new and improved luminescent material also has the further desirable properties of exhibiting great resistance to burning, substantial invariant spectral distribution and a wide band spectral emission. It will be readily appreciated, therefore, that this new luminescent material has many qualities which makes it extremely desirable for use in practice as, for example, providing luminescent screens for cathode ray tubes.

In addition to the above, the method of manufacture results in a luminescent material wherein the very valuable property of controlled spectral emission may be predetermined and controlled by the process of manufacture. In the past, luminescent materials have had their characteristic spectral distributions determined solely by the component parts making up the material, so that the color of the emitted light under excitation of radiant energy, such as cathode ray bombardment, was fixed.

By my invention I have developed a luminescent material wherein it is possible to control the color of the emitted light of wide spectral range by merely changing the proportion of the component materials entering into the composition of the final material, or by varying the time, temperature and/or the rate of heating and cooling of the final firing of the material. Thus, the spectral range can be controlled to provide saturated colors varying from blue-green through to red, including the infra-red, or to provide unsaturated colors derived from this spectral range, including cream colors approximating "white light" at high intensity. Moreover, it is possible to control the time of decay and the color of phosphorescence by variations of composition of the material and the method in which the material is synthesized.

It is thus one of the purposes of my invention to provide a luminescent material in which the spectral emission may be changed from one end of the spectrum to the other throughout the intermediate ranges thereof by changing the proportions of the materials entering into the synthesis of the finally prepared luminescent material.

Moreover, it is one of the purposes of my invention to provide a luminescent material whose spectral emission characteristic may be changed from one end of the spectrum to the other through all of the intermediate wave lengths thereof by controlling the temperature and duration of the heating of the luminescent product during its processing.

A further object of my invention is to shift the emission spectrum from the blue end toward longer wave lengths up to and including the red end by isomorphic mutual replacements and by varying the crystal lattice of the luminescent material.

A still further object of my invention is to prepare a material which will emit light of high intensity under cathode ray bombardment, ultra-violet light, radioactive emanations, and X-rays.

Another object of my invention is to provide a process for synthesizing a luminescent material with invariant spectral distribution with regard to length of time of cathode ray bombardment.

Another object of my invention is to prepare a material which will produce the effect of emitting white light under high intensity cathode ray bombardment. This is accomplished by providing a luminescent material whose emission spectrum characteristic is such that when taken in conjunction with the spectral response characteristic of the human eye, the over-all characteristic is one which provides sufficient energy at complementary wave lengths to give the visible sensation of white.

A still further object of my invention is to provide a process whereby improved luminescent materials may be prepared with minimum expense but, nevertheless, possess the advantage of uniformly superior response characteristics.

Other objects and advantages of my invention will be immediately apparent to those skilled in the art upon reading the following description of my invention.

The luminescent material resulting from my invention is a crystalline structure comprising zinc magnesium cadmium silicate activated by manganese, and the silicate may have a magnesium silicate existing in the ortho or meta form, either separately or together, while the zinc silicate has the ortho form and the cadmium silicate has the meta form, depending upon whether or not there is an excess or deficiency of silicon dioxide.

It should be understood that this is not a mixture of zinc silicate, magnesium silicate, and cadmium silicate in the usual chemical sense, but actually, is a homogeneous crystal comprising manganese activated zinc silicate, magnesium silicate and cadmium silicate in a single crystal lattice structure, or under the second conditions mentioned above, zinc, magnesium, and cadmium oxides are held in a single lattice structure together with manganese and silicon dioxide. In this material, the percentages of the zinc, magnesium and cadmium silicates may be varied from almost zero to 100% with respect to the final material. Thus, a formula which is descriptive of a luminescent material possessing the above outlined characteristics may be expressed as follows:

$$x(Zn_2SiO_4)\, y(Mg_2SiO_4)\, z(CdSiO_3):Mn$$

In this formula, $x/y$ and $y/z$ may vary from 10,000/1 to 1/10,000. This formula is descriptive of the new improved material where the amount of silicon dioxide is such as to give exact molecular proportions. However, where the proportions are not followed and an excess or deficient amount of silicon dioxide is used, then the following formula is descriptive of the new luminescent material:

$$t(ZnO)\, u(MgO)\, v(CdO)\, w(SiO_2):Mn$$

In this case the ratio between $t$, $u$, $v$, and $w$ may be varied over extremely wide limits as indicated above, for example. The composition may also be written as:

$$t(ZnO)\, u(MgO)\, v(CdO)\, w(SiO_2):MnO_x$$

indicating that the manganese activator may be in the form of an oxide and to further indicate that the formula does not mean a chemical composition in the usual sense which chemical formulas indicate. It will be appreciated, of course, that the colon indicates that the substances following the colon are present in very small quantities and constitute the activator. Such terminology has already been used in the art and serves to indicate that the activator is held in such close physical bondage that breaking down the substance even into microscopic particles still gives the substance substantially the same properties as it has in macroscopic aggregates so that for all intents and purposes it might be called a quasi-chemical compound.

The amount of silicon dioxide may be varied from amounts less than needed for molecular proportions to 100% or greater than the molecular proportions. In practice it has been determined that the amount of silicon dioxide may be varied from a lower limit of approximately 20% to an upper limit of approximately 500% of the amount which would be necessary, calculated on the basis of molecular proportions. The amount of manganese may likewise be varied within wide limits—for example, between values of 0.1 molal to 0.00001 molal with respect to the total cation molality. While the amount of manganese may be varied between these wide limits so as to control, in part, the spectral response, it is found that when the amount of manganese is approximately 0.006 molal, the maximum efficiency in conversion of energy to light by the luminescent material is obtained. If this proportion of manganese does not provide the required spectral emission characteristic, the spectral response may be shifted by other means, such as varying the heating treatment or changing the proportions of zinc, magnesium, cadmium or silicon dioxide. Moreover, the spectral response may be shifted or controlled by substituting beryllium in part or in whole for zinc in the above formula in accordance with the method and means described in Patent No. 2,118,091, entitled "Luminescent material," which issued May 24, 1938.

Likewise, germanium may be substituted for silicon in part or in whole, as explained and described in my Patent No. 2,210,087, entitled "Process for synthesizing luminescent material," which issued August 6, 1940.

The steps in the process of mixing, precipitating, heating, and finally comminuting the luminescent material have already been described in detail in my Patent No. 2,210,087, above referred to, in which I have described the preparation of a manganese activated zinc ortho-silicate. The essential difference between the preparation of my new material and that described in my patent is that zinc, magnesium and cadmium nitrates are added to a very finely divided silicon dioxide in suspension, in contra-distinction to the use only of zinc nitrate as described in the patent.

The mixture is heated and stirred and when brought to a boil, there is added very slowly and carefully, with plenty of agitation, saturated ammonium carbonate solution of great purity and in sufficient quantity to precipitate the metallic salts as carbonates on the finely divided silicon dioxide. The contents of the beaker are then evaporated with stirring to dryness and then heated by any appropriate manner to red heat. The contents are then allowed to cool and are ground and mixed with a quartz rod. The resultant product is then placed in a quartz crucible and a suitable quantity of manganese nitrate solution of the greatest purity obtainable is added, the exact quantity ranging between 0.1 and 0.00001 molal with respect to the total cation molality, depending on the actual spectral emission distribution desired.

Quartz-distilled water is then added to the amount to make the mixture thoroughly wet. The crucible is then heated and the contents thereof stirred until brought to a boil, whereupon concentrated ammonium carbonate is added to precipitate the manganese, in the form of manganese carbonate upon the previously precipitated carbonates and oxides.

As an alternative step, the manganese may be present and co-precipitated with the zinc, magnesium, and cadmium right at the beginning, which step is desirable in commercial production when the optimum activator concentration has been determined and is known. The separate or extra activation step first described is a convenience to make variation of the activator easier. When the optimum value has been determined, however, all the components may be precipitated at once and so save this extra step in the process.

The contents comprising the precipitated oxides and carbonates of the crucible are then evaporated with stirring to dryness and upon cooling the contents are ground with a quartz rod. The contents are then transferred to a covered crucible and heated to between 700° and 1600° C. in an electric furnace, for example. It has been found by experience that the optimum temperature lies between 1100°–1500° C. and the heating time is preferably on the order of an hour. The final product is a lightly fritted powder or a fused mass which gives intense cathodoluminescence. It will be appreciated that the resultant color of the luminescent product will depend upon the actual ratios among the zinc, magnesium, and cadmium. As was pointed out above, the spectral emission characteristic can also be controlled by changing the amount of manganese or by controlling the temperature to which the product is heated, or by controlling the length of time that the material is heated.

I may further modify and/or control the emission spectrum characteristic by means of high temperature quenching as described in my Patent No. 2,129,096 entitled "Luminescent material and method of preparing same," which issued September 6, 1938. By means of high temperature quenching, the lattice structure of my improved crystalline material may be expanded with a consequent shift in the emission spectrum toward the longer wave lengths. As a result of this, additional advantages accrue to my materials and methods, since it is possible to utilize a single prepared batch of material for purposes requiring different spectral emission characteristics by the additional step of high-temperature quenching.

In this process it will be noted that no halides and, in particular, no fluorides are used in the process of preparing the composition. Consequently, the necessity for providing platinum ware for use in preparation of my improved luminescent material is unnecessary. Therefore, it is readily seen that the cost of preparing such materials is materially reduced. It will be apparent from the foregoing that this composition of material described by the present invention, in addition to the property of having controlled spectral range, possesses the other desirable features of manganese activated zinc ortho-silicate, which have been enumerated in my Patent No. 2,210,087, referred to above, among which are highly efficient emitting light of high intensity under cathode ray bombardment possessing an invariant spectral distribution with regard to the length of time of cathode ray bombardment, which has cheapness of preparation, controllable spectral emission, and precise spectral emission characteristics controlled by temperature and heating process.

Consequently, my improved process and material have made possible the production of television pictures of improved quality by providing a material which can be coated on the end wall of a cathode ray tube upon which the electro-optical representation is produced, since the color of the resulting luminescence may be controlled to give a white color of high intensity.

It will be readily appreciated that reconstructed images on the end wall of the cathode ray tubes in white color are preferable to the usual bluish-green image, such as provided by the willemite, since people are accustomed to black and white pictures, and my new and improved material affords a practical realization of this ideal, whereas the bluish-green images produced by prior known phosphors are wide of the mark in this respect.

If it is desired to accentuate any one part of the spectrum, the manganese activated zinc magnesium cadmium silicate spectral emission may be peaked in almost any region either by heat treatment or by choosing the suitable proportions among zinc, magnesium and cadmium, or the activator, manganese. If it is desired to increase the secondary emission of this material, the manganese activated zinc magnesium cadmium silicate, which I have described, may be mixed with small amounts of barium, strontium, calcium, caesium, rubidium, lanthanum, cerium, thorium, any of their compounds, or other elements or their compounds, which have large ionic or atomic radii. In certain applications of luminescent material, it is desirable to have high secondary emission and by mixing small amounts of the above identified materials, this desirable feature can be readily obtained.

Having described my invention, what I claim is:

1. A luminescent material consisting of a manganese activated combination of oxides of zinc, magnesium and cadmium and an oxide of an element selected from the group of elements consisting of silicon and germanium, said combination constituting a single lattice structure.

2. A luminescent material consisting of a manganese activated combination of oxides of zinc, beryllium, mangnesium and cadmium and an oxide of an element selected from the group of elements consisting of silicon and germanium, said combination constituting a single lattice structure.

3. A luminescent material consisting of manganese activated zinc magnesium cadmium silicate.

4. A luminescent material consisting of manganese activated zinc beryllium magnesium cadmium silicate.

5. A luminescent material consisting of manganese activated zinc magnesium cadmium salt of an element chosen from the group consisting of silicon and germanium.

6. A luminescent material consisting of a manganese activated zinc beryllium magnesium cadmium salt of an element chosen from the group consisting of silicon and germanium.

7. A luminescent material consisting of a manganese activated zinc beryllium magnesium cadmium salt of an element chosen from the group consisting of silicon and germanium and an alkaline earth element having a large atomic radius, said radius being at least equal to the atomic radius of thorium.

8. A luminescent material consisting of a manganese activated zinc magnesium cadmium salt of an element chosen from the group consisting of silicon and germanium and an alkaline earth element having a large atomic radius, said radius being at least equal to the atomic radius of thorium.

9. A luminescent material consisting of a manganese activated combination of oxides of zinc, magnesium and cadmium and an oxide of an element selected from the group of elements consisting of silicon and germanium and a compound of an element having a large atomic radius, said radius being at least equal to the atomic radius of thorium, the work function of said element being no greater than the work function of thorium, said combination consisting a single lattice structure.

10. A luminescent material consisting of a manganese activated combination of oxides of zinc, beryllium, magnesium and cadmium, and an oxide of an element selected from the group of elements consisting of silicon and germanium and a compound of an element having a large atomic radius, said radius being at least equal to the atomic radius of thorium, the work function of said element being no greater than the work function of thorium, said combination constituting a single lattice structure.

HUMBOLDT W. LEVERENZ.